Nov. 16, 1937.  F. E. HANSEN  2,099,335

HOSE COUPLING

Filed Aug. 28, 1935

INVENTOR.
FRED E. HANSEN
BY
Kwis Hudson & Kent
ATTORNEYS

Patented Nov. 16, 1937

2,099,335

UNITED STATES PATENT OFFICE 2,099,335

HOSE COUPLING

Fred E. Hansen, Lakewood, Ohio

Application August 28, 1935, Serial No. 38,193

2 Claims. (Cl. 284—19)

This invention relates to couplings and, more particularly, to couplings specially adapted for use in connection with hose.

In the case of hose couplings that are commonly used in factories, automobile service stations and other places, it is customary to employ types of couplings that are quickly attachable and detachable both for connecting lengths of hose together and for connecting the hose to nozzles, lubricating devices etc., and one of the objections to the existing types of couplings has been their liability to become accidentally disconnected and permit the pressure fluid to escape from the free end of the hose. This is not only objectionable from the standpoint of the loss of the pressure fluid but also because of the tendency of the hose to lash back and forth and do damage by striking persons or other objects.

It is one of the objects of the present invention to overcome the above described disadvantage of present type of couplings by providing a coupling which embodies a check valve that will prevent the escape of the pressure fluid whenever the parts of the coupling are disconnected, either intentionally or accidentally.

A further object of the invention is to provide a form of safety latch for retaining the parts of the coupling together, which, when accidentally released, will prevent the parts of the coupling from becoming wholly disconnected.

A further object of the invention is to provide a coupling embodying some or all of the features above referred to, that will be simple in construction, comparatively inexpensive to manufacture, and reliable in service.

Other objects of the invention will be apparent from the following description taken in connection with the accompanying drawing, of which Fig. 1 is a side elevation of a coupling embodying my invention;

Figure 2:
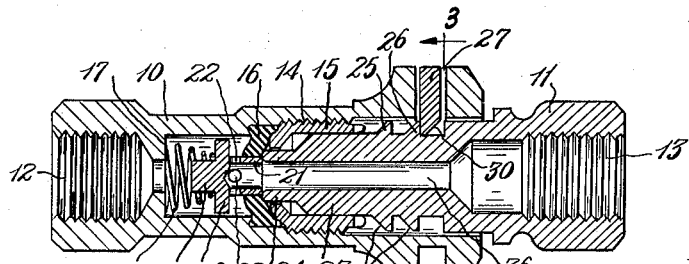
Fig. 2 is an enlarged longitudinal section thereof on the line 2—2 of Fig. 3.
Figure 3:
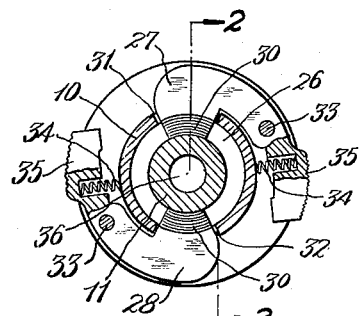
Fig. 3 is a transverse section on the line 3—3 of Fig. 2.

Referring to Figs. 1 to 5, 10 indicates the female member of a hose coupling and 11 the male member. The member 10 is provided with internal threads 12, at one end, for attachment to a correspondingly threaded part on the end of a hose or other device. The member 11 is similarly provided with the internal threads 13.

The member 10 is internally threaded, as at 14, to receive the hollow nut 15 by which a flexible gasket 16 is retained in place. The member 10 also has an internal shoulder 17 formed therein which acts as the abutment for one end of a compression spring 18, the opposite end of this spring engaging a valve 19 which has a boss 20 that projects into the spring and a tubular extension 21 that projects through the gasket 16. The tubular extension 21 is provided with a plurality of lateral openings 22 which permits pressure fluid to flow around the valve 19 when the latter is in the open position shown in Fig. 1.

Figure 1:
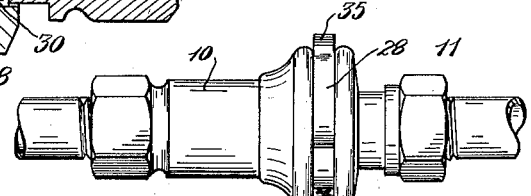

The member 11 has an extension 23 that projects into the hollow nut 15, as shown, and the end of this extension is reduced in diameter as shown at 24, and engages with the gasket 16, when the parts are in the position shown in Fig. 1, and thus prevents the leakage of the pressure fluid through the space between the telescoped portions of the members 10 and 11.

Figure 4:
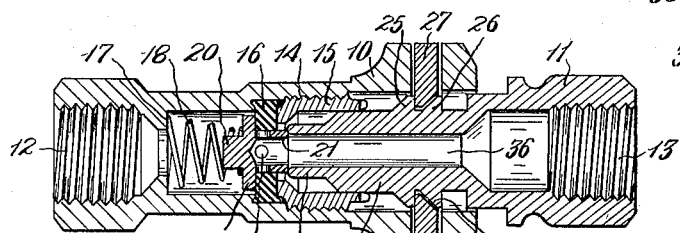
Fig. 4 is a view similar to Fig. 2 but showing the coupling parts in such a position that the check valve is closed although the parts are still connected together.

The extension 23 is also provided with the annular flanges 25 and 26 with which the detents or latching devices 27 and 28 are adapted to cooperate to retain the members 10 and 11 in coupled relation. As indicated at 29, one side of these flanges is beveled to cooperate with the beveled surfaces 30 on the detent 28 so that the members 10 and 11 may be forced into telescoping relation, as shown in Figs. 2 and 4. The detent 27 is arranged in a slot 31 in the member 10 and the detent 28 is arranged in a similar slot 32. The detents are mounted on pivots 33 and are held in cooperating relation with the flanges 25 and 26 by means of the springs 34. It will be noted that each of the detents 27 and 28 has a trigger-like extension 35 which projects radially outward from the periphery of the member 10 so that the detents may be conveniently actuated, manually, when it is desired to uncouple the members 10 and 11.

When the parts of the coupling are connected together, as shown in Fig. 2, the inner end of the member 11 is in engagement with the tubular extension 21 of the valve 19 and the valve thus held away from the gasket 16 which is its open position. In this position, the pressure fluid, which enters the coupling through the member 10, is permitted to flow around the valve 19, through the openings 22, and through the opening 36 in the member 11. It will also be noted that the inner end of the member 11 is pressed against the gasket 16 so as to prevent leakage of the pressure fluid along the exterior of the member 11. Whenever, in the use of the coupling, the trigger portion 35 of one of the detents accidentally strikes an object so as to actuate the detent and disconnect it from the flange 26, the other detent will still hold the members 10 and 11 in coupled relation as shown in Fig. 2. If, under these conditions, the trigger portion of the other detent accidentally strikes an object and the detent is thereby actuated, the member 11 will be permitted to move outwardly, from the member 10, under the influence of the pressure fluid and the spring 18, but, as the member 11 moves outward the springs 34 will force the detents inwardly into engagement with the flange 25 so that the members 10 and 11 will be prevented from becoming completely disconnected. The parts will then be in the position shown in Fig. 4, with the valve 19 closed and the flow of pressure fluid thereby shut off. This will prevent the end of the hose being wrapped around, as is customary when the couplings now in use become disconnected. At the same time, the loss of the pressure fluid will be prevented and the operator, through the stoppage of the flow of the pressure fluid, will be apprised of what has happened.

Figure 6:
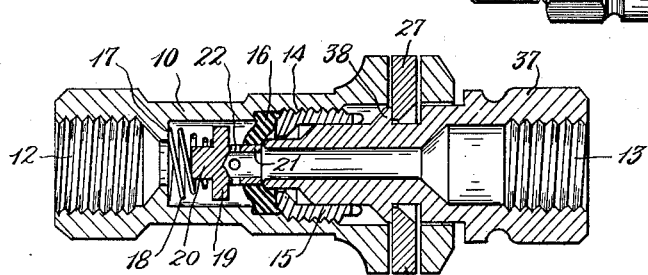
Fig. 6 is a view similar to Fig. 2 but showing a modified form of the invention.
Figure 5:
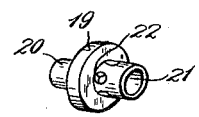
Fig. 5 is a perspective view of the check valve.

In some cases it may not be considered necessary to have both of the flanges 25 and 26, and the flange 25, which is in the nature of a safety device, may be dispensed with. A coupling according to this construction is illustrated in Fig. 6, and it will be noted that the male member 37 of the coupling has the single flange 38 with which the detents 27 and 28 cooperate. In Fig. 6, the parts are shown in their coupled relation, with the valve 19 open, but whenever the detents 27 and 28 are accidentally released, as above described, the male member 37 of the coupling may be fully disconnected but the flow of the pressure fluid will be stopped by the closing of the valve 19. In other respects this form of the invention is similar to that previously described.

Figure 7:
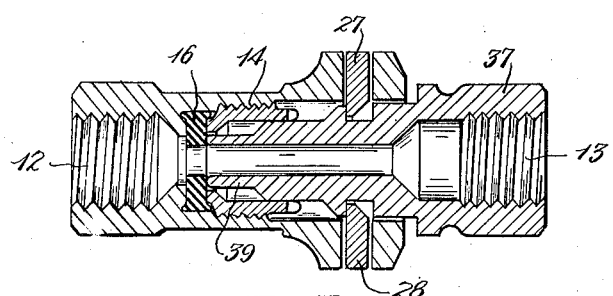
Fig. 7 is a similar view of another modified form.

Some features of my invention may be utilized, with advantage, in couplings which do not embody the check valve 19, and I have described such a coupling in Fig. 7, wherein the pair of detents 27 and 28 are used to hold the members of the coupling together. In this type of coupling, if one of the detents 27 or 28 is accidentally actuated, the other detent will hold the members of the coupling in coupled relation. While, in this form of the invention, the valve 19 is eliminated, the gasket 16 is retained and the inner end portion 39, of the male member of the coupling, engages this gasket and prevents leakage, as previously described. This type of coupling is especially useful in cases where the hose or other devices that are connected together by the coupling are not subject to being moved around and thus the trigger portions of the detents are not liable to be knocked against objects which would actuate the detents. The advantage of using the plurality of detents is that the male and female members of the coupling are thereby held in alignment and leakage is prevented at the point where the end of the male member connects with the gasket 16. When only one detent is used, as has been common in devices of this kind heretofore known, the male and female members of the coupling are subject to slight disalignment which, in many cases, permits leakage of the pressure fluid whereas, when a plurality of detents are used, as in the construction illustrated, and these detents engage diametrally opposite portions of the male member, the two members of the coupling are thereby accurately held in alignment and leakage is prevented.

While I have illustrated and described what I now consider to be the preferred forms of my invention, it will be understood that various changes may be made in the details of construction that are illustrated and described without departing from the spirit of the invention as defined in the appended claims.

Having thus described my invention, I claim:

1. A coupling comprising two tubular members adapted to be arranged in telescoped relation, one of said members having a valve seat therein and a valve cooperating with said seat, the other of said members having means to unseat said valve when said members are in coupled relation, and a plurality of spring actuated detents on one of said members and a plurality of abutments on the other of said members with which said detents engage to retain said members in coupled relation with said valve either in open or closed position, and means for disengaging said detents from said abutments.

2. A coupling comprising two tubular members adapted to be arranged in telescoped relation, one of said members having an internal annular abutment, a gasket seated against said abutment and a threaded ring for securing said gasket in place, the other of said members having an end adapted to seat against said gasket when said members are in coupled relation, the second mentioned member having a plurality of beveled annular collars thereon forming abutments, and the first mentioned member having releasable spring-actuated detent means engageable with either of said abutments to retain said members in different coupled arrangements, said detent means being arranged to be automatically moved to the released position by said collars when said tubular members are forced together into telescopic relation.

FRED E. HANSEN.